United States Patent
Gou et al.

(10) Patent No.: US 12,513,715 B2
(45) Date of Patent: Dec. 30, 2025

(54) METHODS AND DEVICES FOR DETERMINING USER EQUIPMENT TO PERFORM UPLINK FEEDBACK FOR MTCH TRANSMISSION

(71) Applicant: ZTE Corporation, Shenzhen (CN)

(72) Inventors: Wei Gou, Shenzhen (CN); Peng Hao, Shenzhen (CN); Chenchen Zhang, Shenzhen (CN); Wei Chen, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 18/080,004

(22) Filed: Dec. 13, 2022

(65) Prior Publication Data

US 2023/0105434 A1  Apr. 6, 2023

Related U.S. Application Data (63) Continuation of application No. PCT/CN2020/099159, filed on Jun. 30, 2020.

(51) Int. Cl.
*H04W 72/30* (2023.01)
*H04L 5/00* (2006.01)

(52) U.S. Cl.
CPC ........... *H04W 72/30* (2023.01); *H04L 5/0055* (2013.01)

(58) Field of Classification Search
None
See application file for complete search history.

(56) References Cited

U.S. PATENT DOCUMENTS

| | | | |
|---|---|---|---|
| 2010/0325504 A1* | 12/2010 | Lee | H04W 88/02 714/E11.131 |
| 2017/0006437 A1 | 1/2017 | Guo et al. | |
| 2017/0367083 A1* | 12/2017 | Cave | H04W 72/20 |
| 2019/0007891 A1 | 1/2019 | Xu et al. | |
| 2019/0222969 A1* | 7/2019 | Fujishiro | H04W 36/04 |
| 2022/0278804 A1* | 9/2022 | Wang | H04L 12/1881 |
| 2023/0209313 A1* | 6/2023 | Chin | H04W 4/06 370/329 |

FOREIGN PATENT DOCUMENTS

| | | |
|---|---|---|
| CN | 104780026 A | 7/2015 |
| CN | 106470398 A | 3/2017 |
| EP | 2 600 642 A1 | 6/2013 |

(Continued)

OTHER PUBLICATIONS

International Search Report and Written Opinion regarding PCT/CN2020/099159 dated Mar. 26, 2021, 7 pages.

(Continued)

*Primary Examiner* — Diane L Lo
(74) *Attorney, Agent, or Firm* — Crowell & Moring LLP (57) ABSTRACT

The present disclosure describes methods, system, and devices for determining a user equipment (UE) to perform multimedia broadcast multicast (MBMS) uplink feedback. The method includes receiving, by at least one UE, a multicast traffic channel (MTCH) transmission in a MBMS service from a radio access network (RAN). The method further includes, in response to determining that a channel quality indicator (CQI) of the UE satisfies a preset condition, determining, by the UE, to perform MBMS uplink feedback.

10 Claims, 8 Drawing Sheets

(56) References Cited

FOREIGN PATENT DOCUMENTS

| EP | 4 140 155 A1 | 3/2023 |
| WO | WO 2007148934 A1 | 12/2007 |
| WO | WO 2008/021573 A2 | 2/2008 |
| WO | WO 2008/021573 A3 | 2/2008 |
| WO | WO 2021/109478 A1 | 6/2021 |

OTHER PUBLICATIONS

Nokia Networks, "Link Adaptation and Reception of SC-PTM in RRC_Idle," R2-152580, 3GPP TSG-RAN WG2 Meeting #90, May 29, 2015.
Catt, "Single-cell MBMS Transmission in UnicasUMBMS-Mixed Cells," R2-080725, 3GPP TSG RAN WG2 meeting#61, Feb. 15, 2008.
Extended European Search Report regarding EP 20 94 3641 dated Jun. 12, 2023.
Chinese Office Action with English translation, Nov. 8, 2024, pp. 1-13, issued in Chinese Patent Application No. 202080102673.1, State Intellectual Property Office, Beijing, China.
Chinese Search Report with English translation, Nov. 8, 2024, pp. 1-5, issued in Chinese Application No. 2020801026731, State Intellectual Property Office, Beijing, China.
Chinese-language Office Action issued in Chinese Patent Application No. 202080102673.1 dated Apr. 24, 2025, with English translation (12 pages).
Communication pursuant to Article 94(3) EPC issued in EP Application No. 20 943 641.9-1206, dated Sep. 29, 2025 (7 pages).
Written Opinion issued in Vietnamese Application No. 1-2023-00143, dated Sep. 24, 2025, with English translation (3 pages).

\* cited by examiner

FIG. 4 receiving, by at least one UE, a multicast traffic channel (MTCH) transmission in a MBMS service from a radio access network (RAN);
510 in response to determining that a preset uplink feedback condition is satisfied, determining, by the UE, to perform MBMS uplink feedback
520

700 receiving, by at least one UE, a multicast traffic channel (MTCH) transmission in a MBMS service from a radio access network (RAN);
710 in response to determining that an uplink feedback channel resource for MBMS uplink feedback is configured by the RAN, determining, by the UE, to perform MBMS uplink feedback.
720

FIG. 7

METHODS AND DEVICES FOR DETERMINING USER EQUIPMENT TO PERFORM UPLINK FEEDBACK FOR MTCH TRANSMISSION

CROSS-REFERENCE TO RELATED APPLICATION

This application is a continuation application of PCT International Patent Application No. PCT/CN2020/099159, filed with the China National Intellectual Property Administration, PRC on Jun. 30, 2020, which is herein incorporated by reference in its entirety.

TECHNICAL FIELD

The present disclosure is directed generally to wireless communications. Particularly, the present disclosure relates to methods and devices for determining user equipment (UE) to perform uplink feedback for multicast traffic channel (MTCH) transmission.

BACKGROUND

Wireless communication technologies are moving the world toward an increasingly connected and networked society. High-speed and low-latency wireless communications rely on efficient network resource management and allocation between user equipment (UE) and wireless access network nodes, including but not limited to radio access network (RAN). The RAN may communicate with one or more UE in a multimedia broadcast multicast (MBMS) service. The present disclosure may address the issues and/or problems in determining whether a UE needs to perform uplink feedback for multicast traffic channel (MTCH) transmission.

SUMMARY

This document relates to methods, systems, and devices for wireless communication, and more specifically, for determining whether a user equipment (UE) perform uplink feedback for multicast traffic channel (MTCH) transmission.

In one embodiment, the present disclosure describes a method for wireless communication. The method includes determining a user equipment (UE) to perform multimedia broadcast multicast (MBMS) uplink feedback by receiving, by at least one UE, a multicast traffic channel (MTCH) transmission in a MBMS service from a radio access network (RAN); and in response to determining that a channel quality indicator (CQI) of the UE satisfies a preset condition, determining, by the UE, to perform MBMS uplink feedback.

In another embodiment, the present disclosure describes a method for wireless communication. The method includes determining a user equipment (UE) to perform multimedia broadcast multicast (MBMS) uplink feedback by receiving, by at least one UE, a multicast traffic channel (MTCH) transmission in a MBMS service from a radio access network (RAN); and in response to determining that a preset uplink feedback condition is satisfied, determining, by the UE, to perform MBMS uplink feedback.

In another embodiment, the present disclosure describes a method for wireless communication. The method includes determining a user equipment (UE) to perform multimedia broadcast multicast (MBMS) uplink feedback by receiving, by at least one UE, a multicast traffic channel (MTCH) transmission in a MBMS service from a radio access network (RAN); and in response to a parameter in a signaling received by the UE being a first value, determining, by the UE, to perform MBMS uplink feedback.

In another embodiment, the present disclosure describes a method for wireless communication. The method includes determining a user equipment (UE) to perform multimedia broadcast multicast (MBMS) uplink feedback by receiving, by at least one UE, a multicast traffic channel (MTCH) transmission in a MBMS service from a radio access network (RAN); and in response to determining that an uplink feedback channel resource for MBMS uplink feedback is configured by the RAN, determining, by the UE, to perform MBMS uplink feedback.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments"

as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for determining whether a user equipment (UE) needs to perform multimedia broadcast multicast (MBMS) uplink feedback for multicast traffic channel (MTCH) transmission.

Next generation (NG), or 5th generation (5G), wireless communication may provide a range of capabilities from downloading with fast speeds to support real-time low-latency communication. The wireless communication may have a multimedia broadcast multicast (MBMS) service. A radio access network (RAN), for example, a wireless base station, may transmit data to a specific UE, which is unicast; the RAN may transmit data to a group of at least one UE simultaneously, which is group-cast; or the RAN may transmit data to all UEs simultaneously that may receive the transmission, which is broadcast. In some case, multiple base stations can transmit the same data simultaneously so that a particular UE may receive the same data from multiple base stations.

Figure 1A:
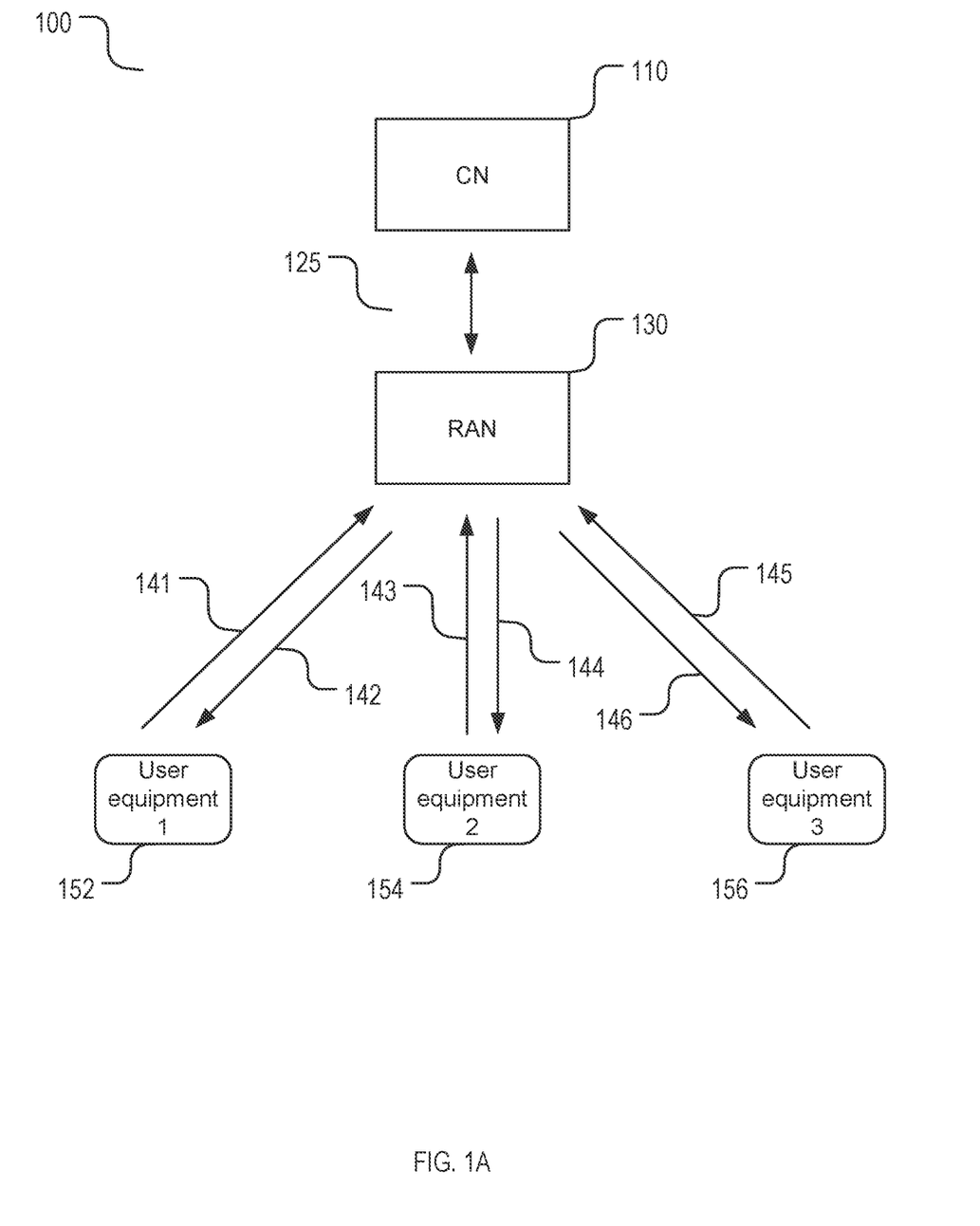
FIG. 1A shows an example of a point-to-point communication in a wireless communication system.
Figure 1B:
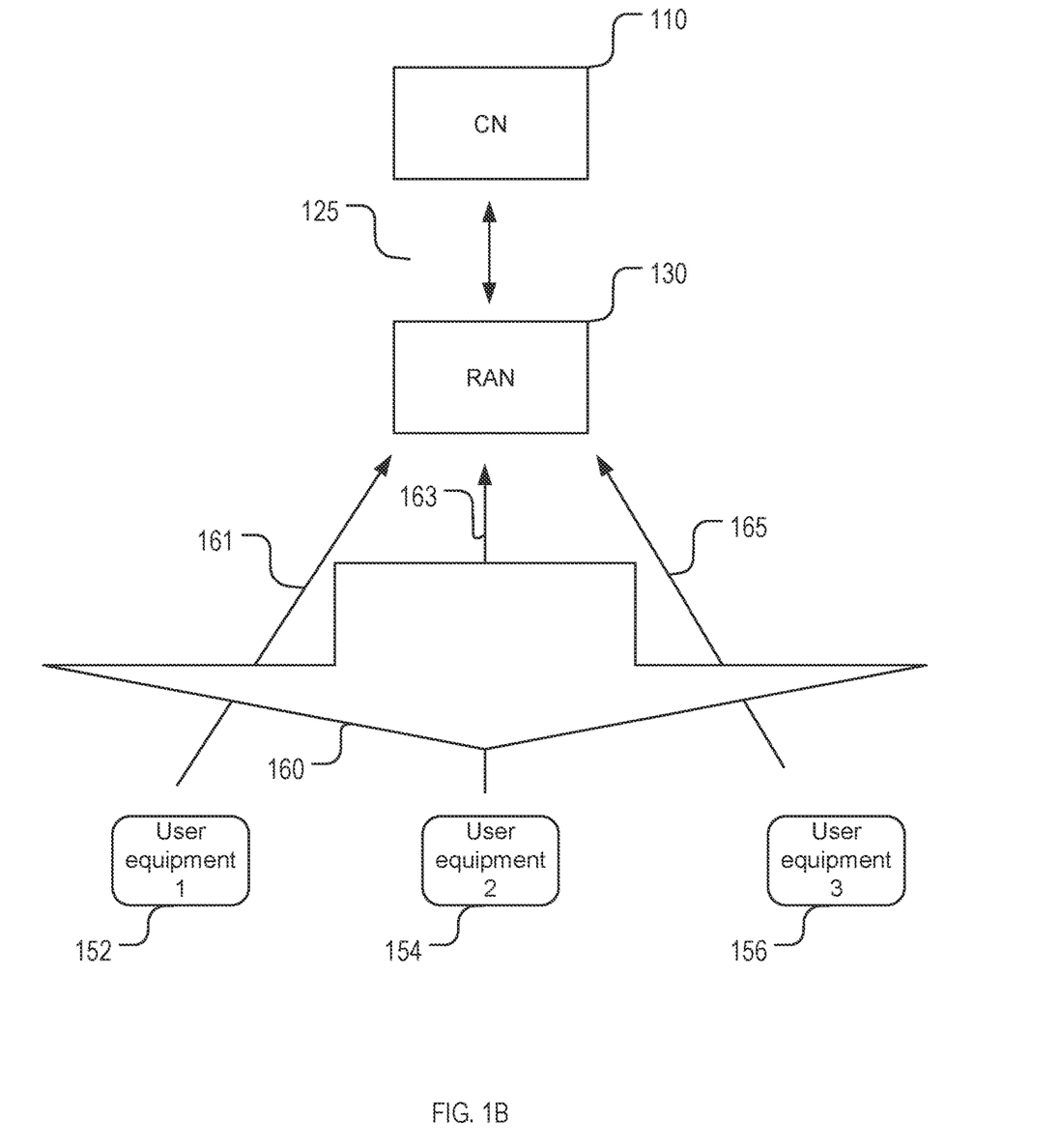
FIG. 1B shows an example of a multicast communication in a wireless communication system.

FIGS. 1A and 1B show various transmission modes for a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a NG interface.

The communication between the RAN and the one or more UE may include at least a multimedia broadcast multicast (MBMS) service and/or a unicast service. UEs may receive data from the RAN via a point-to-point (PTP) or unicast service, and/or receive data from the RAN via a point-to-multipoint (PTM) or multicast or broadcast service.

Referring to FIG. 1A, a first UE 152 may wirelessly receive communication from the RAN 130 via a downlink unicast 142 and wirelessly send communication to the RAN 130 via a uplink channel 141. Likewise, a second UE 154 may wirelessly receive communicate from the RAN 130 via a downlink unicast 144 and wirelessly send communication to the RAN 130 via a uplink channel 143; and a third UE 156 may wirelessly receive communicate from the RAN 130 via a downlink unicast 146 and wirelessly send communication to the RAN 130 via a uplink channel 145.

Referring to FIG. 1B, the RAN 130 may wirelessly communicate to one or more UEs (152, 154, and 156) via a multicast traffic channel (MTCH) transmission in a MBMS service 160. In one implementation, the first UE 152 may wirelessly send communication to the RAN 130 via an uplink channel 161. Likewise, the second UE 154 may wirelessly send communication to the RAN 130 via an uplink channel 163; and the third UE 156 may wirelessly send communication to the RAN 130 via an uplink channel 165.

In the wireless communication system 100 in FIGS. 1A and 1B, the RAN 130 may send a MTCH transmission in the MBMS service to one or more UE. There may be some problems or issues, including that the UE does not provide a hybrid automatic repeat request acknowledgement/negative-acknowledgment (HARQ-ACK/NACK) information to the RAN. The HARQ-ACK information may indicate whether the MTCH transmission is correctly received by the UE. At least due to these problems and/or issues, this MTCH transmission will not be re-transmitted when the previous transmission of this MTCH was not correctly received by at least one UE. The MBMS service is a broadcast service, for example, MTCH transmission may be always transmitted to different UEs through point-to-multipoint (PTM), and these UEs may not provide uplink feedback information, such as HARQ-ACK, channel state information (CSI), etc. The uplink feedback mechanism may be complicated for one MTCH transmission, for example, it may be challenging to design the uplink feedback channel resource of MBMS service. Once a UE feeds back NACK for an MTCH transmission, it is also challenger to retransmit the MTCH for this UE. At least due to the above discussed problems and/or issues, it is challenging for using the uplink feedback information in a MBMS service.

In the wireless communication system 100, a medium access control (MAC) layer may compose MBMS service data or at least one MTCH transmission data into a data packet, and then the data packet may be transmitted to a physical layer. At the physical layer, the data packet is transmitted through a physical downlink shared channel (PDSCH) and scheduled through a physical downlink control channel (PDCCH). The decoding result of the PDSCH corresponding to the MTCH transmission data may be used as uplink feedback information, and be transmitted to the base station through the uplink feedback channel resource (corresponding to the MTCH transmission included in the PDSCH). Therefore, the uplink feedback channel resource corresponds to one MTCH transmission, that is, corresponds to one PDSCH carrying the MTCH transmission. The uplink feedback information corresponds to one MTCH transmission, that is, corresponds to one PDSCH carrying the MTCH transmission. The following description may focus on MTCH merely as an example.

The above-mentioned way of allocating uplink feedback channel resources for MTCH transmission/MBMS service may be also fully applicable to one PDCCH. The PDCCH schedules a PDSCH, and the PDSCH may contain one or more MTCH transmission data, and/or MBMS service data. For example, the MTCH transmission in the above embodiment may be replaced with a PDCCH, and the uplink feedback channel resources allocated for MTCH transmission may be replaced with uplink feedback channel resources allocated for one PDCCH scheduling a PDSCH carrying the MTCH transmission. A UE may transmit the uplink feedback information related to one PDCCH through the uplink feedback channel resource corresponding to the PDCCH. For example, an uplink feedback channel resource shared by at least one UE may be allocated for NACK; and/or an uplink feedback channel resource shared by at least one UE may be allocated for discontinuous transmission (DTX).

In one implementation, an uplink feedback channel resource may be allocated for NACK to be shared by a first UE (UE1) and a second UE (UE2), and an uplink feedback channel resource may be allocated for DTX to be shared by the UE1 and the UE2. In this way, for the UE1 and the UE2, the corresponding uplink feedback may be performed according to the actual decoding situation of the PDCCH and the PDSCH corresponding to the PDCCH as at least one of the following conditions.

For one condition, when the UE1 and/or the UE2 correctly receives the PDCCH that schedules a PDSCH carrying MTCH transmission data, but does not correctly decode the PDSCH, the UE1 and/or the UE2 may report NACK (or send a predefined signal, such as a sequence) in the uplink feedback channel resource corresponding to NACK shared by the UE1 and the UE2.

For another condition, when an uplink feedback channel resource is allocated for ACK to be shared by the UE1 and the UE2, and the UE1 and/or the UE2 correctly decode the PDCCH that schedules a PDSCH carrying MTCH transmission data and correctly decode the PDSCH, the UE1 and/or the UE2 may report the ACK (or send a predefined signal, such as a sequence) in the uplink feedback channel resource corresponding to ACK shared by the UE1 and the UE2.

In this way, the base station can obtain that the PDCCH is not correctly decoded by at least one UE, and thus adjust the code rate adopted by the PDCCH according to the feedback result of the UE. The UEs receive the PDCCH share uplink feedback channel resources, which is conducive to saving uplink feedback channel resources. In this way, it is equivalent to allocating two shared uplink feedback channel resources for uplink feedback information related to the PDCCH and uplink feedback information related to the PDSCH. The UE may only need to transmit corresponding uplink feedback information for the case that the PDCCH and/or PDSCH are not received correctly.

The MBMS service may be transmitted by broadcast and may be received by all UEs in the cell. Under the condition that the base station requires uplink feedback information (such as ACK/NACK) for a certain MTCH/MBMS transmission, all UEs receiving this MTCH/MBMS transmission need to participate in uplink feedback. Thus, a problem may arise that a large amount of uplink feedback resources may be needed for the UEs to transmit the uplink feedback, requiring a large amount of resources and affecting the performance of the wireless system.

The present disclosure describes methods and devices for determining a user equipment (UE) to perform uplink feedback for MTCH transmission. The present disclosure may address at least some of the problems discussed above by reducing uplink feedback resources. The present disclosure may reduce the number of UEs participating in uplink feedback, and thus provide a solution such that a small number of UEs participate in uplink feedback once, but the effect of uplink feedback is not lower than that of all UEs participating in uplink feedback.

Figure 2:
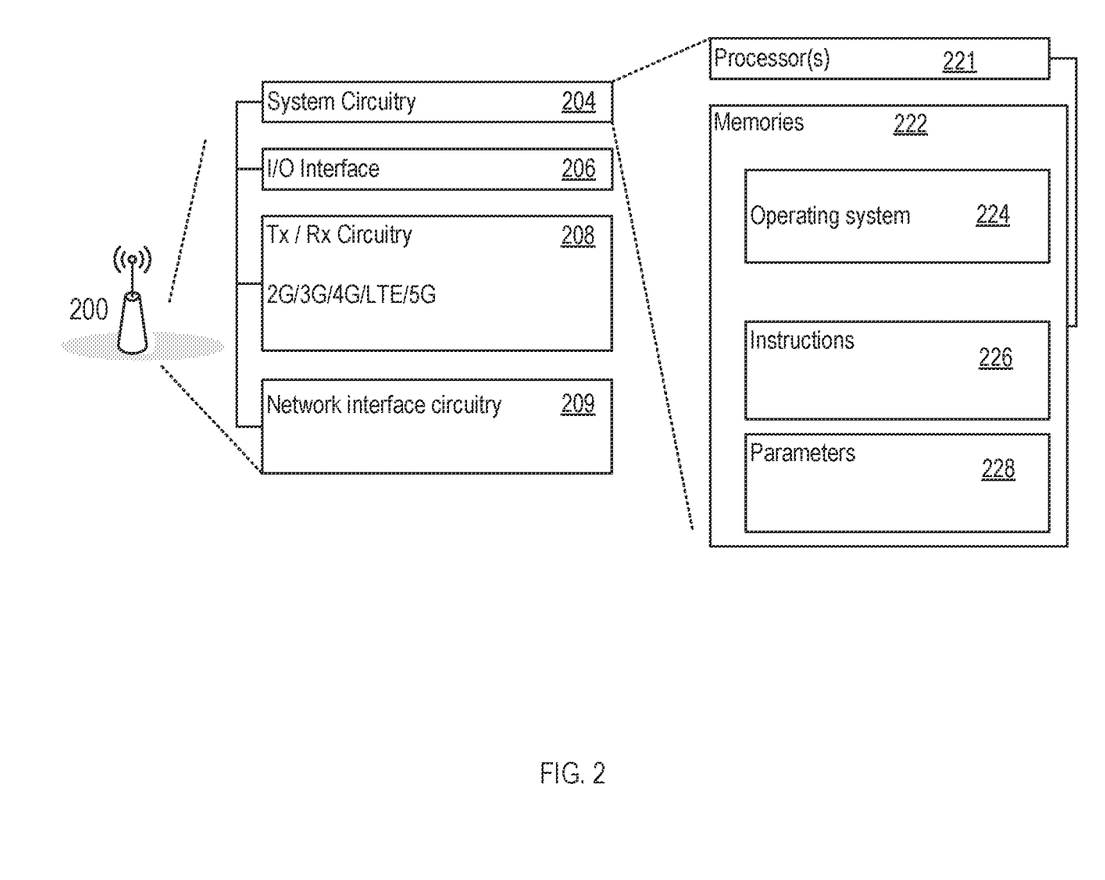
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
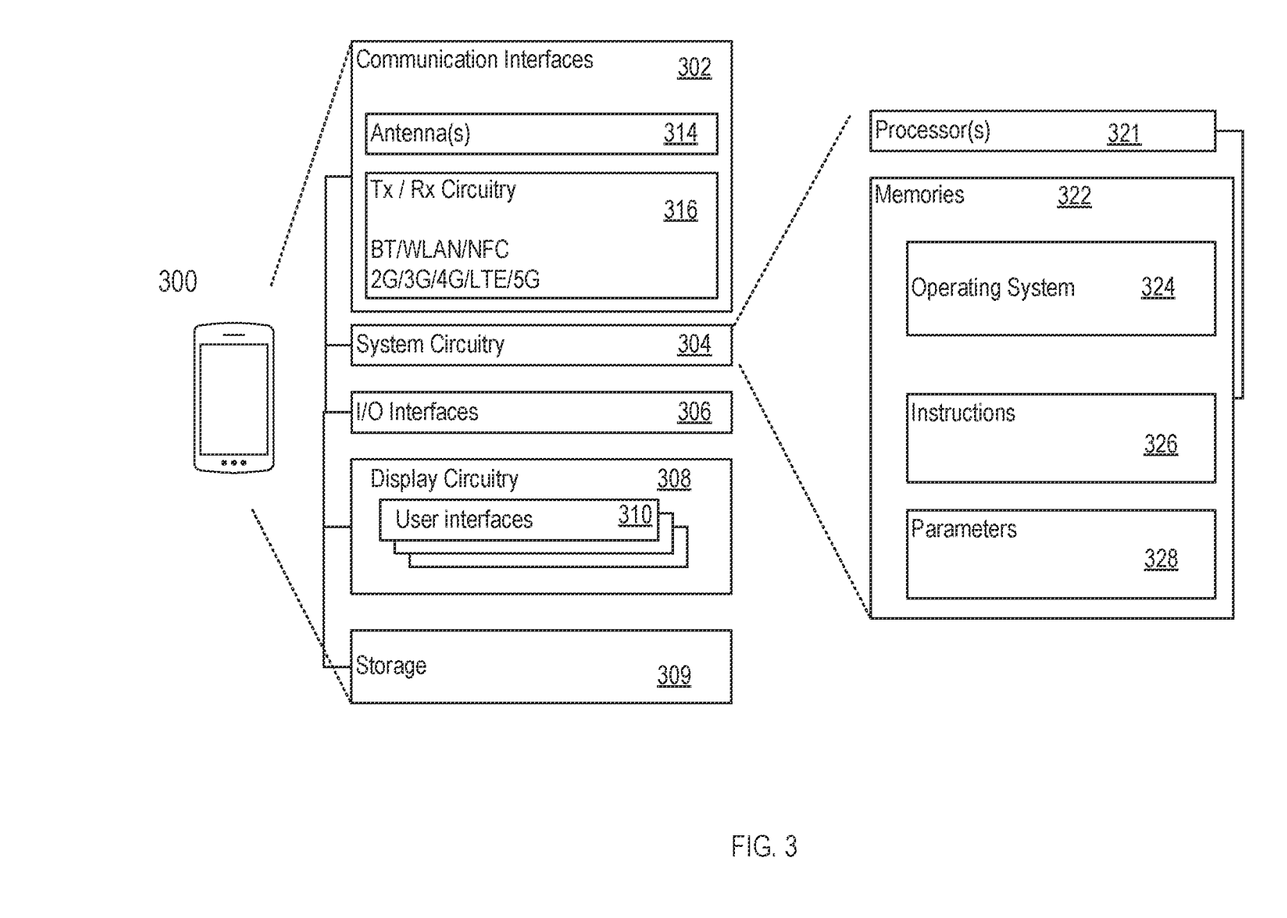
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for determining whether a UE performs uplink feedback for MTCH transmission, which may be implemented, partly or totally, on the wireless network base station and/or the user equipment described above in FIGS. 2 and 3.

Figure 4:
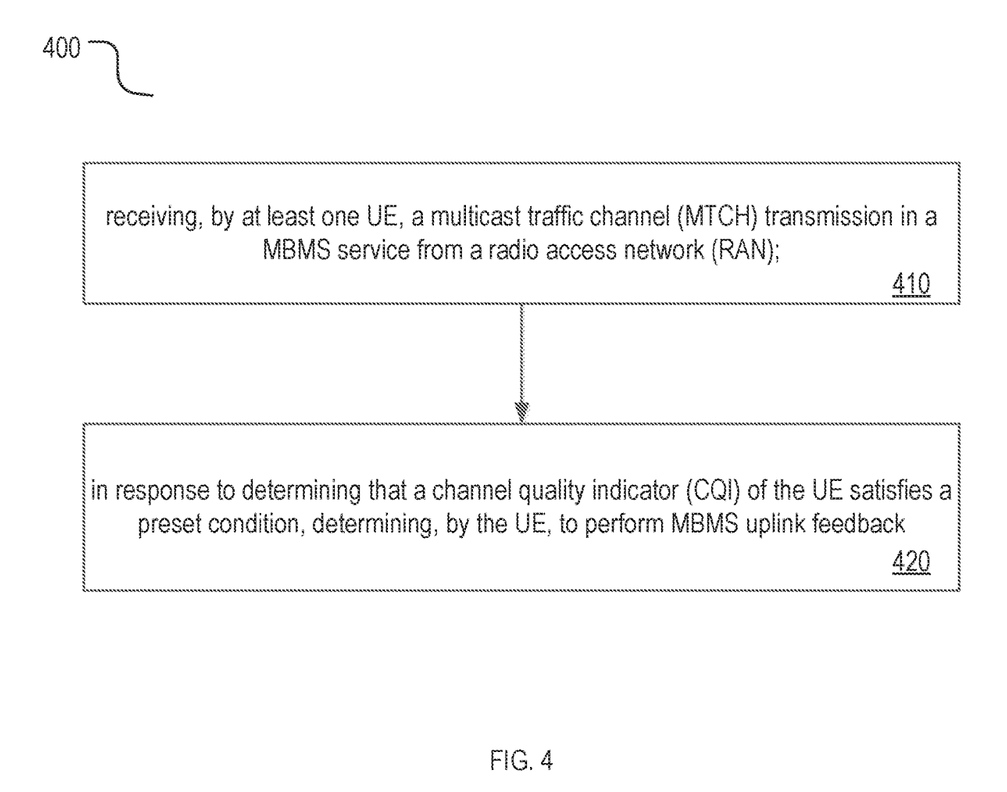
FIG. 4 shows a flow diagram of a method for wireless communication.

In various embodiments, referring to FIG. 4, a method 400 for wireless communication includes determining a user equipment (UE) to perform multimedia broadcast multicast (MBMS) uplink feedback. The method 400 may include a portion or all of the following steps: step 410: receiving, by at least one UE, a multicast traffic channel (MTCH) transmission in a MBMS service from a radio access network (RAN); and step 420: in response to determining that a channel quality indicator (CQI) of the UE satisfies a preset condition, determining, by the UE, to perform MBMS uplink feedback.

In one implementation, the MTCH transmission in the MBMS service may be transmitted from the RAN to one or more UE via a physical downlink shared channel (PDSCH). The MBMS uplink feedback corresponds to the PDSCH carrying the MTCH transmission.

The MBMS-related uplink feedback information may include at least one of the following: a hybrid automatic repeat request acknowledgement/negative-acknowledgment (HARQ-ACK/NACK), a NACK-only feedback, a channel state information (CSI) feedback, or a reception status feedback.

In one implementation in response to the MBMS-related uplink feedback information including HARQ-ACK information, the UE performing the MBMS uplink feedback may include generating HARQ-ACK information, constructing HARQ-ACK codebook, and then transmitting the HARQ-ACK codebook for the MBMS-related uplink feedback information corresponding to the MTCH transmission via a physical uplink control channel (PUCCH).

In another implementation in response to the MBMS-related uplink feedback information including CSI feedback, the UE performing the MBMS uplink feedback may include measuring CSI information, generating CSI feedback information, and then transmitting the CSI feedback information for the MBMS-related uplink feedback information corresponding to the MTCH transmission.

In one implementation, optionally, the method 400 may include receiving, by the at least one UE, configuration information comprising a preset threshold via a configuration message from the RAN. The configuration message may include at least one of the following: a physical downlink control channel (PDCCH) message, a single cell multicast control channel (SC-MCCH) message, a multiple cell multicast control channel (MC-MCCH) message, or a radio resource control (RRC) message.

In another implementation, the preset threshold in the configuration information may be a Channel Quality Indicator (CQI) threshold. The method may determine one or more UEs that need to participate in uplink feedback for a channel transmission. The channel transmission may include a PDSCH carrying one or more MTCHs, or an MTCH.

In response to the CQI of the UE being not higher than the preset threshold, the UE performs the MBMS uplink feedback, and in response to the CQI of the UE being higher than the preset threshold, the UE does not perform the MBMS uplink feedback.

For example, the CQI threshold is set to A. One or more UE with CQI higher than A may not perform uplink feedback. This is considered that the CQI of the one or more UE is relatively good, and it is generally believed that they can correctly receive the channel transmission requiring uplink feedback with a high probability. Therefore, the one or more UE may not participate in uplink feedback, reducing the number of uplink feedback UEs.

One or more UE with CQI not higher than A need to perform uplink feedback. This is considered that the CQI of the one or more UE is relatively bad, and it is generally believed that they less likely correctly receive the channel transmission requiring uplink feedback with a high probability.

In another implementation, the RAN sends to the at least one UE a physical downlink control channel (PDCCH) indicating a CQI threshold. When the CQI of the UE is less than the CQI threshold, the UE performs the MBMS uplink feedback. When the CQI of the UE is larger or equal to the CQI threshold, the UE does not need to perform the MBMB uplink feedback.

In another implementation, the RAN sends to the at least one UE a physical downlink control channel (PDCCH) indicating a CQI threshold. When CQI2−CQI1>T, wherein CQI2 is the CQI of the UE, CQI1 is the CQI threshold, and T is the preset threshold, the UE performs the MBMS uplink feedback. When CQI2−CQI1≤T, the UE does not need to perform the MBMS uplink feedback.

The preset threshold in the configuration message configured by RAN may not change frequently, so it may be regarded as a semi-static parameter/threshold. The CQI threshold in the PDCCH may change frequently and/or readily, so it may be regarded as a dynamic parameter/threshold. By combining the semi-static and dynamic parameters/thresholds, the present disclosure provides a versatile solution, addressing the problems discussed above.

In another implementation, when the CQI of the UE is lower than the preset threshold, the UE performs the MBMS uplink feedback, and when the CQI of the UE is not lower than the preset threshold, the UE does not perform the MBMS uplink feedback.

In another implementation, the RAN sends to the at least one UE a physical downlink control channel (PDCCH)

indicating a CQI threshold. When the CQI threshold is more than the CQI of the UE, the UE performs the MBMS uplink feedback. When the CQI threshold is not more than the CQI of the UE, the UE does not perform the MBMS uplink feedback.

In another implementation, the RAN sends to the at least one UE a physical downlink control channel (PDCCH) indicating a CQI threshold. When CQI4−CQI3<T, wherein CQI4 is the CQI of the UE, CQI3 is the CQI threshold, and T is the preset threshold, the UE performs the MBMS uplink feedback. When CQI4−CQI3≥T, the UE does not perform the MBMS uplink feedback.

Throughout the specification and claims, embodiments and/or implementations are described for an action being performed in response to comparing two quantities (A and B). These embodiments and/or implementation of how to handle conditions of the two quantities being equal are mere examples, and the present disclosure is not limited to these embodiments and/or implementations. The condition of two quantities being equal may be handled the same as A>B, or may be handled the same as A<B. For example, one implementation may describe a first action is performed when A>B, and a second action is performed when A≤B. The present disclosure also includes another implementation, in which a first action is performed when A B, and a second action is performed when A<B.

Figure 5:
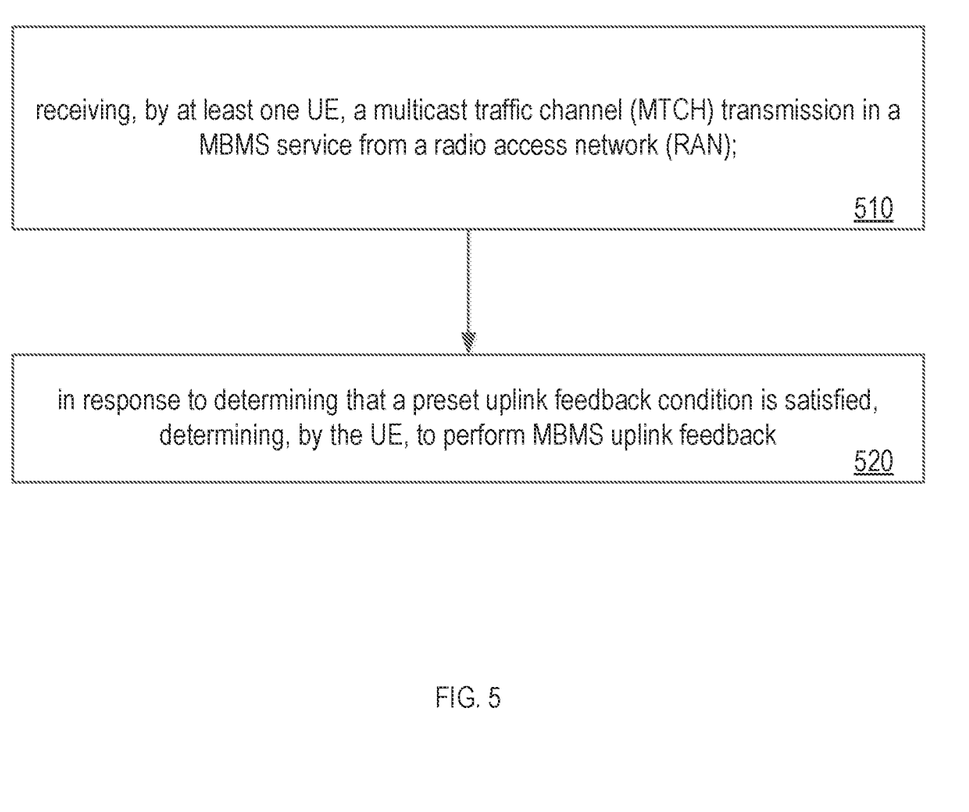
FIG. 5 shows a flow diagram of a method for wireless communication.

In various embodiments, referring to FIG. 5, a method 500 for wireless communication includes determining a user equipment (UE) to perform multimedia broadcast multicast (MBMS) uplink feedback. The method 500 may include a portion or all of the following steps: step 510: receiving, by at least one UE, a multicast traffic channel (MTCH) transmission in a MBMS service from a radio access network (RAN); and step 520: in response to determining that a preset uplink feedback condition is satisfied, determining, by the UE, to perform MBMS uplink feedback. In one implementation, performing MBMS uplink feedback includes transmitting MBMS-related uplink feedback information corresponding to the MTCH transmission; and a resource for transmitting MBMS-related uplink feedback information may include a physical uplink control channel (PUCCH). In another implementation, the MBMS-related uplink feedback information may include at least one of the following: a hybrid automatic repeat request acknowledgement/negative-acknowledgment (HARQ-ACK/NACK), a NACK-only feedback, a channel state information (CSI) feedback, or a reception status feedback. In another implementation, the at least one UE may include at least one of the following: all UEs receiving the MTCH transmission, a UE receiving the MTCH transmission, or a group of UEs receiving the MTCH transmission.

The base station may configure uplink feedback conditions in order to allow uplink feedback for an MBMS service. When the uplink feedback condition is satisfied for one or more UE, the corresponding one or more UE performs uplink feedback for MTCH transmission. When the uplink feedback condition is not satisfied for one or more UE, the corresponding one or more UE does not perform uplink feedback for the MTCH transmission.

In one embodiment, the configuration of uplink feedback conditions may include a time period and a threshold. The time period may be used as the time range of statistical parameters. The statistical parameters may include, for example but not limited to, a number of correctly received PDSCHs carrying MTCH transmissions, a number of incorrectly received PDSCHs carrying MTCH transmissions, and a total number of PDSCHs carrying MTCH transmissions.

These statistical parameters or the values obtained between them through predefined calculation rules may be compared with the predefined threshold to determine whether the UE performs uplink feedback.

In one implementation, the method 500 may optionally include receiving, by the at least one UE, configuration information comprising the preset uplink feedback condition via a configuration message from the RAN. The configuration message may include at least one of the following: a physical downlink control channel (PDCCH) message, a single cell multicast control channel (SC-MCCH) message, a multiple cell multicast control channel (MC-MCCH) message, or a radio resource control (RRC) message.

In another implementation, the configuration information includes a time period and a preset threshold. When during the time period, a cumulative number of times that a physical downlink shared channel (PDSCH) carrying the MTCH transmission being correctly received by the UE exceeds the preset threshold, the UE performs the MBMS uplink feedback. When during the time period, a cumulative number of times that a physical downlink shared channel (PDSCH) carrying the MTCH transmission being correctly received by the UE does not exceed the preset threshold, the UE does not perform the MBMS uplink feedback. This implementation may be performed per MTCH, or per UE, or per UE group.

In another implementation, the configuration information includes a time period and a preset threshold. When during the time period, a ratio of a first number and a second number exceeds the preset threshold, the UE performs the MBMS uplink feedback. The first number is a number that a physical downlink shared channel (PDSCH) carrying the MTCH transmission has been incorrectly received by the UE, and the second number is a number that a physical downlink shared channel (PDSCH) carrying the MTCH transmission has been correctly received by the UE. When during the time period, a ratio of a first number and a second number does not exceed the preset threshold, the UE does not perform the MBMS uplink feedback. For example, during this time period, it is determined whether the ratio of the number of PDSCHs (for MTCH transmission) received incorrectly to the number of PDSCHs (for MTCH transmission) received correctly exceeds the threshold. When the threshold is exceeded, the UE performs uplink feedback for the MTCH transmission. When the threshold is not exceeded, the UE does not perform uplink feedback. This implementation may be performed per MTCH, or per UE, or per UE group.

In another implementation, the configuration information comprises a preset quality of service (QoS) threshold. When a QoS of the MTCH transmission received by the UE is lower than the preset QoS threshold, the UE performs the MBMS uplink feedback. When a QoS of the MTCH transmission received by the UE is not lower than the preset QoS threshold, the UE does not perform the MBMS uplink feedback. For example, the base station may set the threshold for uplink feedback according to the QoS (Quality of Service) corresponding to the MTCH transmission. The QoS required for an MTCH transmission is set to a threshold. When the UE receives the MTCH transmission, when the QoS of the MTCH on the UE side is lower than the threshold, the UE needs to perform uplink feedback; when the QoS of the MTCH on the UE is not lower than the threshold, the UE does not perform uplink feedback. The threshold in this implementation may be configured per MTCH, or per UE, or per UE group.

In another implementation, the configuration information includes a preset quality threshold. When a reception quality of the MTCH transmission received by the UE is lower than the preset quality threshold, the UE performs the MBMS uplink feedback. When a reception quality of the MTCH transmission received by the UE is not lower than the preset quality threshold, the UE does not perform the MBMS uplink feedback. In one implementation, a reception quality of the MTCH transmission received by the UE may include a plurality of quantized levels, for example but not limited to, excellent, good, fair, and poor. For example, the base station may set the conditions for uplink feedback according to the predefined reception quality. The base station and the UE may quantize the MTCH reception quality into multiple levels. The base station configures a threshold for receiving quality. When the reception quality of the UE is lower than the threshold, the UE performs uplink feedback, otherwise the UE does not perform uplink feedback. For example, the reception quality is quantified into 4 levels, for example, "excellent", "good", "general" and "poor". The threshold may be set to any level, for example, a level of "Poor". The threshold in this implementation may be configured per MTCH, or per UE, or per UE group.

Figure 6:
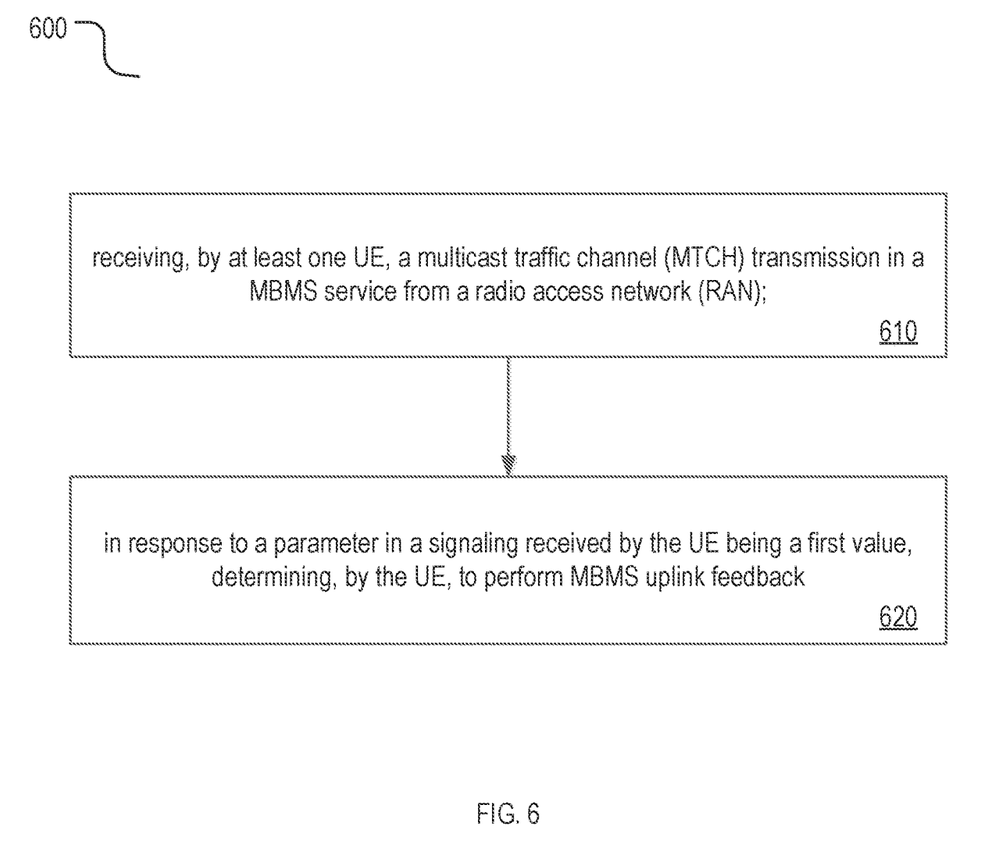
FIG. 6 shows a flow diagram of a method for wireless communication.

In various embodiments, referring to FIG. 6, a method 600 for wireless communication includes determining a user equipment (UE) to perform multimedia broadcast multicast (MBMS) uplink feedback. The method 600 may include a portion or all of the following steps: step 610: receiving, by at least one UE, a multicast traffic channel (MTCH) transmission in a MBMS service from a radio access network (RAN); and step 620: in response to a parameter in a signaling received by the UE being a first value, determining, by the UE, to perform MBMS uplink feedback. In one implementation, performing MBMS uplink feedback includes transmitting MBMS-related uplink feedback information corresponding to the MTCH transmission; and a resource for transmitting MBMS-related uplink feedback information may include a physical uplink control channel (PUCCH). In another implementation, the MBMS-related uplink feedback information may include at least one of the following: a hybrid automatic repeat request acknowledgement/negative-acknowledgment (HARQ-ACK/NACK), a NACK-only feedback, a channel state information (CSI) feedback, or a reception status feedback. In another implementation, the at least one UE may include at least one of the following: all UEs receiving the MTCH transmission, a UE receiving the MTCH transmission, or a group of UEs receiving the MTCH transmission.

In one embodiment, a first new signaling may be introduced. The first new signaling may be used to notify the UE that it needs or does not need to perform uplink feedback for the PDSCH carrying an MTCH transmission. When the parameter in the signaling is configured to notify the UE that the UE needs to perform uplink feedback for a physical downlink shared channel (PDSCH) carrying the MTCH transmission, the UE performs the MBMS uplink feedback. Performing the MBMS uplink feedback includes transmitting MBMS-related uplink feedback information corresponding to the MTCH transmission. When the parameter in the signaling is not configured to notify the UE that the UE needs to perform uplink feedback for a physical downlink shared channel (PDSCH) carrying the MTCH transmission, the UE does not perform the MBMS uplink feedback. For example, one or more UE may be notified to perform uplink feedback for MTCH transmission. Or, one or more UE may be notified not to perform uplink feedback for MTCH transmission.

In another embodiment, a second new signaling may be introduced. The second new signaling may be used to inform the UE that an MTCH transmission is required or not required to perform uplink feedback. When the parameter in the signaling is configured to notify the UE that the MTCH transmission is required to perform uplink feedback, the UE performs the MBMS uplink feedback. Performing the MBMS uplink feedback includes transmitting MBMS-related uplink feedback information corresponding to the MTCH transmission. When the parameter in the signaling is not configured to notify the UE that the MTCH transmission is required to perform uplink feedback, the UE does not perform the MBMS uplink feedback. For example, when a first MTCH is notified to perform uplink feedback through the second signaling, the UE receiving the first MTCH transmission needs to perform uplink feedback. When a second MTCH is not required to perform uplink feedback through the second signaling, the UE that receives the second MTCH transmission may not perform uplink feedback.

In one implementation, the base station informs the UE to perform uplink feedback for one or more MTCH transmissions via the PDCCH for scheduling PDSCH carrying MTCH transmission. The signaling includes a PDCCH received by the UE from the RAN, the PDCCH configured for scheduling a PDSCH carrying the MTCH transmission. When the parameter in the PDCCH is the first value configured by the RAN, the parameter indicates the UE to perform uplink feedback for the MTCH transmission and the UE perform the uplink feedback. When the parameter in the PDCCH is a second value configured by the RAN, the parameter indicates the UE not to perform uplink feedback for the MTCH transmission and the UE does not perform the uplink feedback. For example, introducing a new parameter field in a PDCCH, or reinterpreting an existing parameter field in a PDCCH. This parameter field is used to indicate to the UE: Uplink feedback is required (or not required) to perform for an MTCH transmission. If the base station wants the UE to perform uplink feedback for a first MTCH transmission, the base station sets the corresponding value of this parameter field in the PDCCH scheduling the PDSCH carrying the first MTCH transmission, so that the UE receiving the MTCH1 transmission performs corresponding uplink feedback. Correspondingly, if the base station does not want the UE to perform uplink feedback for the first MTCH transmission, the base station sets the corresponding value of this parameter field in the PDCCH scheduling the PDSCH to carry the first MTCH transmission, so that the UE receiving the first MTCH transmission does not perform corresponding uplink feedback. In one implementation, this parameter field in the PDCCH may be extended to indicate that multiple MTCH transmissions are required (or not required) to perform uplink feedback, respectively. Using PDCCH to notify an MTCH that transmission is required (or not required) to perform uplink feedback provides high flexibility because PDCCH may be transmitted densely.

In one implementation, a new parameter may be introduced in a single cell multicast control channel (SC-MCCH), which may be used to indicate that the MTCH transmission is required (or not required) to perform uplink feedback. SC-MCCH may be configured as a MBMS control channel. The signaling may include a SC-MCCH received by the UE from the RAN. When the parameter in the SC-MCCH is the first value configured by the RAN, the parameter indicates the UE to perform uplink feedback for the MTCH transmission and the UE performs the uplink feedback. When the parameter in the SC-MCCH is a second value configured by the RAN, the parameter indicates the UE not to perform uplink feedback for the MTCH transmission and the UE does not perform the uplink feedback. For example, if the base station wants to perform uplink feedback for a first MTCH, the base station sets the new parameter in the SC-MCCH to the corresponding value, indicating that the first MTCH needs to perform uplink feedback. Correspondingly, on the UE side, when receiving the SC-MCCH, the UE knows through the new parameter that the first MTCH needs to perform uplink feedback, then the UE receiving the first MTCH transmission perform uplink feedback.

Optionally, when the parameter being changed, the RAN updates an update indication information corresponding to the SC-MCCH. When the UE receives the updated update indication information corresponding to the SC-MCCH, the UE receives the SC-MCCH from the RAN to obtain the changed parameter again. For example, when the value of the new parameter in the SC-MCCH changes, it should cause an update indication information corresponding to the SC-MCCH to also change. In this way, for a UE that is monitoring the update indication information corresponding to the SC-MCCH, when the UE finds that the update indication information changes, the UE can learn that the SC-MCCH has changed, so that the UE receives the SC-MCCH again, thereby learning the latest value of the new parameters.

In one implementation, a new radio resource control (RRC) signaling may be send by the base station to the UE and indicate that an MTCH transmission is required (or not required) to perform uplink feedback. For example, new RRC parameters are introduced in system broadcast messages, or in system broadcast messages for MBMS or in UE-specific RRC messages. The signaling includes a RRC received by the UE from the RAN, the RRC configured by the RAN comprises a system broadcast message for MBMS. When the parameter in the RRC is the first value configured by the RAN, the parameter indicates the UE to perform uplink feedback for the MTCH transmission and the UE performs the uplink feedback. When the parameter in the RRC is a second value configured by the RAN, the parameter indicates the UE not to perform uplink feedback for the MTCH transmission and the UE does not perform the uplink feedback. The RRC includes at least one of the following: a system broadcast message, or a UE-specific RRC message. For example, when the base station wants to perform uplink feedback for a first MTCH, the base station sets the new parameter in the system broadcast messages for MBMS to the corresponding value, indicating that the first MTCH needs to perform uplink feedback. Correspondingly, on the UE side, when receiving the system broadcast messages for MBMS, the UE knows through the new parameter that the first MTCH needs to perform uplink feedback, then the UE receiving the first MTCH transmission performs uplink feedback.

When the parameter is changed, the RAN updates an update indication information corresponding to the system broadcast message for MBMS. When the UE receives the updated update indication information corresponding to the system broadcast message for MBMS, the UE receives the RRC from the RAN to obtain the changed parameter again. For example, when the value of the new parameter in the system broadcast messages for MBMS changes, it should cause an update indication information corresponding to the system broadcast messages for MBMS to also change. In this way, for a UE that is monitoring the update indication information corresponding to the system broadcast messages for MBMS, when the UE finds that the update indication information changes, the UE can learn that the system broadcast messages for MBMS has changed; so that the UE receives the system broadcast messages for MBMS again, thereby learning the latest value of the new parameters.

In one implementation, a new medium access control (MAC) control element (CE) may be introduced to notify the UE that it is required (or not required) to perform uplink feedback for MTCH transmission. When the MAC CE is the first value configured by the RAN, the MAC CE indicates the UE to perform uplink feedback for the MTCH transmission and the UE performs the uplink feedback. When the MAC CE is a second value configured by the RAN, the MAC CE indicates the UE not to perform uplink feedback for the MTCH transmission and the UE does not perform the uplink feedback. For one example, a MAC CE may be designed to be per UE to notify a UE that it is required (or not required) to perform uplink feedback for MTCH transmission. The MAC CE may be transmitted based on the unicast PDSCH or based on PDSCH carrying MTCH transmission. Here, the MAC CE can also include: for which MTCH transmissions the UE is required (or not required) to perform uplink feedback. For example, if the base station wants a first UE to provide uplink feedback for a first MTCH transmission, then the base station can transmit the MAC CE to the first UE, and the MAC CE contains first MTCH information. On the first UE side, after the first UE receives the MAC CE, the first UE learns that it is required to perform uplink feedback and is for first MTCH transmission. Of course, it may also be that the MAC CE only informs the first UE that uplink feedback needs to be performed for MTCH transmission, and then the base station determines which MTCH transmissions are required to perform uplink feedback through other methods (such as the other methods described above).

In another implementation, he MAC CE is transmitted from the RAN to the UE based on a unicast PDSCH or a PDSCH carrying the MTCH transmission; and in response to receiving the MAC CE containing the MTCH information, the UE is configured to perform uplink feedback for the MTCH transmission. For example, the MAC CE can also be designed as per MTCH to notify an MTCH that transmission is required (or not required) to perform uplink feedback. MAC CE can be transmitted based on PDSCH carrying MTCH transmission or transmitted based on unicast PDSCH. Here, the UE performs uplink feedback for the PDSCH carrying MTCH transmission. For example, if the base station wants the UE to perform uplink feedback for first MTCH transmission, then the base station can transmit the MAC CE in the PDSCH carrying first MTCH transmission. On the corresponding UE side, if the UE receives the PDSCH carrying the first MTCH transmission, the UE obtains the MAC CE and learns that the UE receiving the MTCH1 transmission is required to perform uplink feedback for first MTCH transmission.

Figure 7:
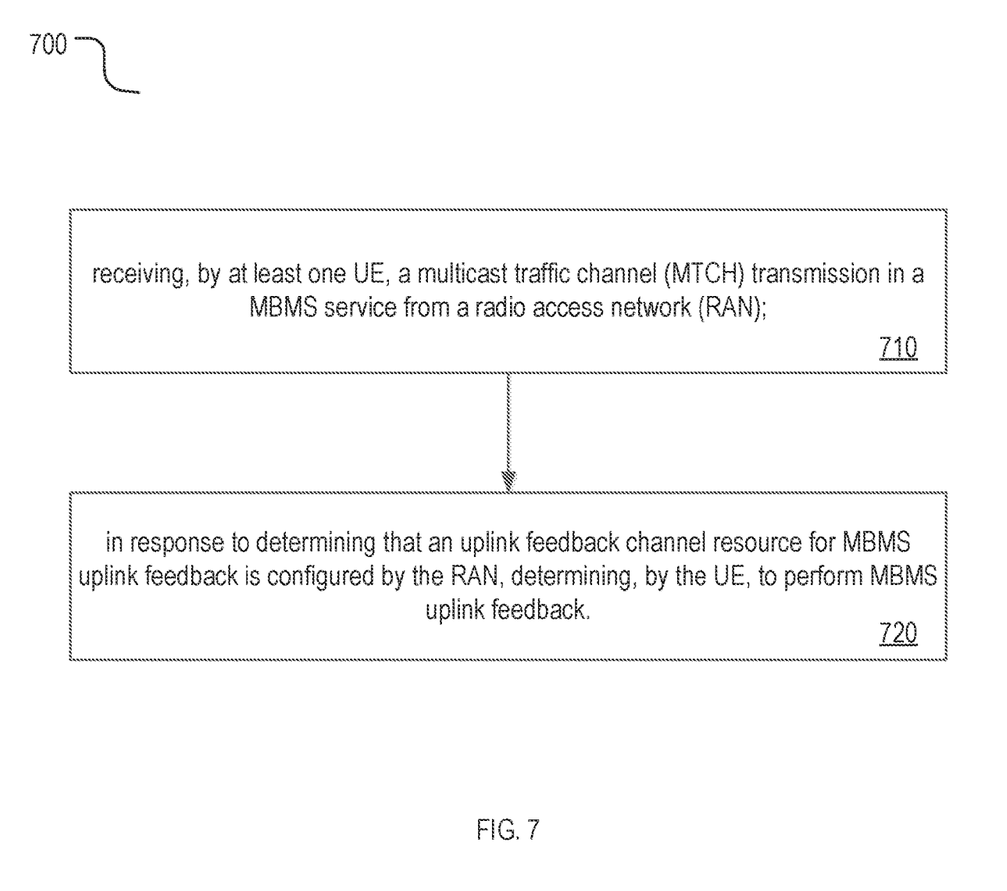
FIG. 7 shows a flow diagram of a method for wireless communication.

In various embodiments, referring to FIG. 7, a method 700 for wireless communication includes determining a user equipment (UE) to perform multimedia broadcast multicast (MBMS) uplink feedback. The method 700 may include a portion or all of the following steps: step 710: receiving, by at least one UE, a multicast traffic channel (MTCH) transmission in a MBMS service from a radio access network (RAN); and step 720: in response to determining that an uplink feedback channel resource for MBMS uplink feedback is configured by the RAN, determining, by the UE, to perform MBMS uplink feedback. In one implementation, the UE receiving the MTCH transmission performs uplink feedback for the MTCH transmission, and performing MBMS uplink feedback includes transmitting MBMS-related uplink feedback information corresponding to the MTCH transmission. In another implementation, the MBMS-related uplink feedback information may include at least one of the following: a hybrid automatic repeat request acknowledgement/negative-acknowledgment (HARQ-ACK/NACK), a NACK-only feedback, a channel state information (CSI) feedback, or a reception status feedback.

In one implementation, the base station and the UE may agree that if the UE is configured with an uplink feedback channel resource, when the UE is receiving an MTCH transmission, it needs to perform uplink feedback for the MTCH transmission. Here, the uplink feedback channel resource is per UE and/or per MTCH. Here, the receiving one MTCH transmission includes the UE receiving the PDSCH carrying the MTCH transmission. The RAN configures the uplink feedback channel resource corresponding to the MTCH transmission per the UE; and/or the RAN configures the uplink feedback channel resource corresponding to the MTCH transmission per the MTCH transmission.

For one example of the uplink feedback channel resource being per UE, when a base station wants a UE to provide uplink feedback corresponding to MTCH transmission, the base station can configure uplink feedback channel resources for the UE. On the UE side, a UE obtains uplink feedback channel resources, and the UE performs uplink feedback for the MTCH transmission being received.

For another example of the uplink feedback channel resource being per MTCH, if the base station wants the UE to provide uplink feedback for an MTCH transmission, the base station can configure uplink feedback channel resources corresponding to the MTCH. On the UE side, the UE obtains an uplink feedback channel resource corresponding to an MTCH transmission, and the UE that receives the MTCH transmission performs uplink feedback.

Without any limitation, parts and/or all of the embodiments and implementations describes above may be used in combination or alternatively means.

The present disclosure describes methods, apparatus, and computer-readable medium for wireless communication. The present disclosure addressed the issues with determining user equipment (UE) to perform uplink feedback for multicast traffic channel (MTCH) transmission. The methods, devices, and computer-readable medium described in the present disclosure may facilitate the performance of wireless communication by determining UE whether to perform uplink feedback for MTCH transmission, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
    determining a user equipment (UE) to perform multimedia broadcast multicast (MBMS) uplink feedback by:
        receiving, by at least one UE, a multicast traffic channel (MTCH) transmission in one MBMS service from a radio access network (RAN); and
        in response to a signaling received by the UE being from a radio resource control (RRC), determining, by the UE, to or not to perform MBMS uplink feedback by transmitting MBMS-related uplink feedback information corresponding to the MTCH transmission, wherein the MBMS-related uplink feedback information includes at least one of: a hybrid automatic repeat request acknowledgement/ negative acknowledgement (HARQ-ACK/NACK), a NACK-only feedback, or a reception status feedback, wherein:
        in response to the signaling in the RRC as a first value configured by the RAN, a parameter indicates the UE to perform the uplink feedback for the MTCH transmission, and wherein in response to a signaling in a physical downlink control channel (PDCCH) received by the UE from the RAN, the PDCCH configured for scheduling a PDSCH carrying the MTCH transmission,
        in response to the signaling in the PDCCH as a second value configured by the RAN, the parameter indicates the UE to perform the uplink feedback for the MTCH transmission, and
        in response to the signaling in the PDCCH as a third value configured by the RAN, the parameter indicates the UE not to perform the uplink feedback for the MTCH transmission.

2. The method according to claim 1, wherein:
    in response to the parameter being changed, the RAN updates an update indication information; and
    in response to receiving the updated update indication information, the UE receives the RRC from the RAN to obtain the changed parameter again.

3. The method according to claim 1, wherein:
    the UE determines whether the UE performs the uplink feedback for the MTCH transmission based on indication of the parameter in the PDCCH or in the RRC.

4. A method for wireless communication, comprising:
    determining a user equipment (UE) to perform multimedia broadcast multicast (MBMS) uplink feedback by:
        sending, by a radio access network (RAN) to at least one UE, a multicast traffic channel (MTCH) transmission in a one MBMS service; and
        in response to a signaling received by the UE being from a radio resource control (RRC), receiving, by the RAN from the UE, MBMS uplink feedback by receiving MBMS-related uplink feedback information corresponding to the MTCH transmission, wherein the MBMS-related uplink feedback information includes at least one of: a hybrid automatic repeat request acknowledgement/negative acknowledgement (HARQ-ACK/NACK), a NACK-only feedback, or a reception status feedback-, wherein:

in response to the signaling in the RRC as a first value configured by the RAN, a parameter indicates the UE to perform the uplink feedback for the MTCH transmission, in response to a signaling in a physical downlink control channel (PDCCH) received by the UE from the RAN, the PDCCH configured for scheduling a PDSCH carrying the MTCH transmission, in response to the signaling in the PDCCH as a second value configured by the RAN, the parameter indicates the UE to perform the uplink feedback for the MTCH transmission, and in response to the signaling in the PDCCH as a third value configured by the RAN, the parameter indicates the UE not to perform the uplink feedback for the MTCH transmission.

5. The method according to claim 4, wherein:

in response to the parameter being changed, the RAN updates an update indication information; and in response to receiving the updated update indication information, the UE receives the RRC from the RAN to obtain the changed parameter again.

6. The method according to claim 4, wherein:

the UE determines whether the UE performs the uplink feedback for the MTCH transmission based on indication of the parameter in the PDCCH or in the RRC.

7. A device comprising:

a memory storing instructions; and a processor in communication with the memory, wherein, when the processor executes the instructions, the processor is configured to cause the device to perform:

receiving a multicast traffic channel (MTCH) transmission in one MBMS service from a radio access network (RAN); and in response to a signaling received by the device being from a radio resource control (RRC), determining to or not to perform multimedia broadcast multicast (MBMS) uplink feedback by transmitting MBMS-related uplink feedback information corresponding to the MTCH transmission, wherein the MBMS-related uplink feedback information includes at least one of: a hybrid automatic repeat request acknowledgement/negative acknowledgement (HARQ-ACK/NACK), a NACK-only feedback, or a reception status feedback, wherein:

in response to the signaling in the RRC as a first value configured by the RAN, a parameter indicates the device to perform the uplink feedback for the MTCH transmission, in response to a signaling in a physical downlink control channel (PDCCH) received by the device from the RAN, the PDCCH configured for scheduling a PDSCH carrying the MTCH transmission, in response to the signaling in the PDCCH as a second value configured by the RAN, the parameter indicates the device to perform the uplink feedback for the MTCH transmission, and in response to the signaling in the PDCCH as a third value configured by the RAN, the parameter indicates the device not to perform the uplink feedback for the MTCH transmission.

8. The device according to claim 7, wherein:

the device determines whether the device performs the uplink feedback for the MTCH transmission based on indication of the parameter in the PDCCH or in the RRC.

9. A wireless communication node comprising:

a memory storing instructions; and a processor in communication with the memory, wherein, when the processor executes the instructions, the processor is configured to cause the wireless communication node to perform:

determining a user equipment (UE) to perform multimedia broadcast multicast (MBMS) uplink feedback by:

sending, to at least one UE, a multicast traffic channel (MTCH) transmission in one MBMS service; and in response to a signaling received by the UE being from a radio resource control (RRC), receiving, from the UE, MBMS uplink feedback by receiving MBMS-related uplink feedback information corresponding to the MTCH transmission, wherein the MBMS-related uplink feedback information includes at least one of: a hybrid automatic repeat request acknowledgement/negative acknowledgement (HARQ-ACK/NACK), a NACK-only feedback, or a reception status feedback, wherein:

in response to the signaling in the RRC as a first value configured by the wireless communication node, a parameter indicates the UE to perform the uplink feedback for the MTCH transmission, in response to a signaling in a physical downlink control channel (PDCCH) received by the UE from the wireless communication node, the PDCCH configured for scheduling a PDSCH carrying the MTCH transmission, in response to the signaling in the PDCCH as a second value configured by the wireless communication node, the parameter indicates the UE to perform the uplink feedback for the MTCH transmission, and in response to the signaling in the PDCCH as a third value configured by the wireless communication node, the parameter indicates the UE not to perform the uplink feedback for the MTCH transmission.

10. The wireless communication node according to claim 9, wherein:

the signaling comprises an RRC and a PDCCH sent by the wireless communication node to the UE, the signaling received through the RRC is used to determine the uplink feedback for the MTCH transmission, and the UE determines whether the UE performs the uplink feedback for the MTCH transmission based on indication of the parameter in the PDCCH or in the RRC.

* * * * *

UNITED STATES PATENT AND TRADEMARK OFFICE
CERTIFICATE OF CORRECTION

Page 1 of 1

PATENT NO. : 12,513,715 B2
APPLICATION NO. : 18/080004
DATED : December 30, 2025
INVENTOR(S) : Wei Gou et al.

It is certified that error appears in the above-identified patent and that said Letters Patent is hereby corrected as shown below:

In the Claims

In Column 16, Claim 4, Line 60, delete "a".

Signed and Sealed this
Tenth Day of February, 2026

John A. Squires
*Director of the United States Patent and Trademark Office*